Oct. 3, 1967    G. W. MYLER ETAL    3,344,736
ROTISSERIE
Filed Sept. 15, 1965    2 Sheets-Sheet 1

INVENTORS
GEORGE W. MYLER
ROBERT A. CLARK
BY
ATTORNEY.

INVENTORS
GEORGE W. MYLER
ROBERT A. CLARK
BY
*Louis Necho*
ATTORNEY.

United States Patent Office 3,344,736
Patented Oct. 3, 1967

3,344,736
ROTISSERIE
Geroge W. Myler, Emmaus, and Robert A. Clark, Allentown, Pa., assignors to Caloric Corporation, Topton, Pa., a corporation of Pennsylvania
Filed Sept. 15, 1965, Ser. No. 487,509
2 Claims. (Cl. 99—421)

ABSTRACT OF THE DISCLOSURE

A knock-down, portable rotisserie for use over an extraneous source of heat.

This invention relates to a rotisserie.

More specifically it relates to a portable rotisserie mechanism which is carried by an open frame which is placed over a fire or other source of heat.

One object is to produce a rotisserie which can be taken off the fire and carried directly to the table.

A problem encountered in rotisserie cooking is that the foods to be cooked are of different sizes and must be supported at different heights from the fire and that foods of the same size may have to be cooked at different degrees of heat.

A still further object is to produce a rotisserie in which the height of the food supporting spit may be adjusted in relation to the fire.

A still further object is to produce a rotisserie which is lightweight, durable, inexpensive, easy to operate and one which can be completely dismantled to facilitate cleaning and/or storage.

The full nature of this invention will be understood from the following specifications and the acompanying drawings in which.

Figure 4:
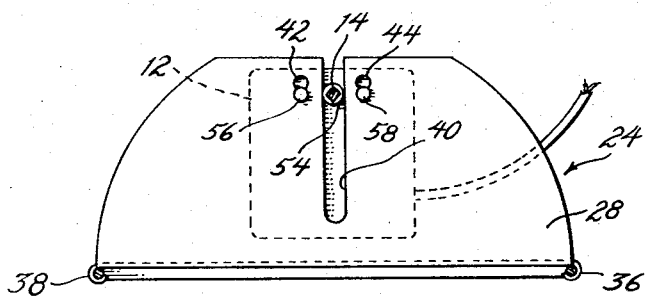
FIG. 4 is an enlarged view looking in the direction of line 4—4 on FIG. 3.
Figure 5:
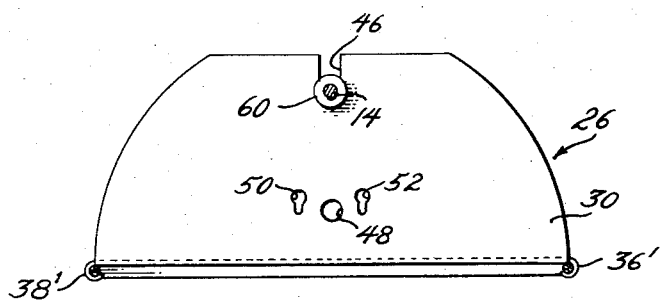
FIG. 5 is an enlarged view looking in the direction of line 5—5 on FIG. 3.

A rotisserie embodying the invention includes a base 10, a motor 12 and a spit 14. Base 10 is comprised of a rectangular frame 16, handles 18 and 20, and legs 22 which are secured to the frame. Handles 18 and 20 carry spit supports 24 and 26 respectively, said supports comprising vertical walls 28 and 30 which are connected to horizontal fastening members 32 and 34 respectively. The transverse ends of members 32 and 34 are turned downwardly and toward each other to form channels 36, 36′, 38 and 38′ for engaging said handles as shown in FIGS. 4 and 5. It should be noticed that handles 18 and 20 are greatest in width where they join frame 16 and decrease slightly in width toward their free end. This tapering facilitates initial engagement of said channels and said handles, it being understood that as supports 24 and 26 are moved inwardly, or toward each other, they will engage the increasing width of said handles, whereby the spit supports are firmly held in position.

Wall 28 of spit support 24 is provided with an elongated slot 40 and two key-slots 42 and 44. Similarly, wall 30 of spit support 26 is provided with a slot 46, an opening 48, and two key-slots 50 and 52. Motor 12 is of a conventional type so constructed to provide slow rotational output through a hollow shaft 54 which is engageable with one end of spit 14, as shown in FIG. 4. Shaft 54 and spit 14 have the same cross sectional configuration, which in this case is square. Carried by the motor housing, and located on either side of shaft 54 are two lugs 56 and 58, each of which being formed of a head section and a neck section of smaller thickness. Near its other end of spit 14 is provided with a grooved hub 60 for selectively engaging slot 40 or 46 and beyond hub 60, the end of spit 14 is threaded for attachment to handle 62.

It will be noticed that slot 40 extends to about the bottom of spit support 24 while slot 46 terminates well above the bottom of spit support 26; that key slots 42 and 44 are near the top of spit support 24 and that opening 48 and key slots 50 and 52 are near the bottom of support 26.

Figure 1:
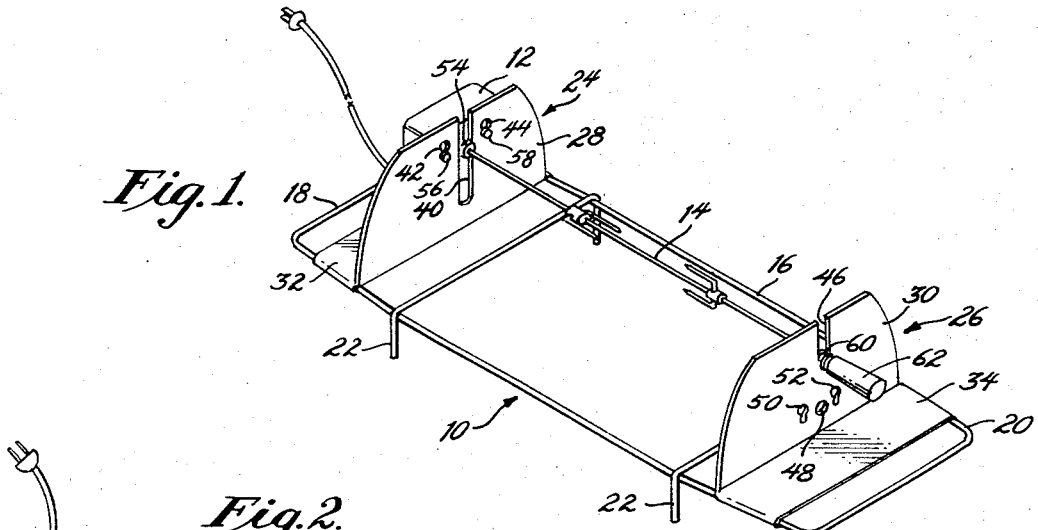
FIG. 1 is a perspective view of a rotisserie embodying the invention.
Figure 2:
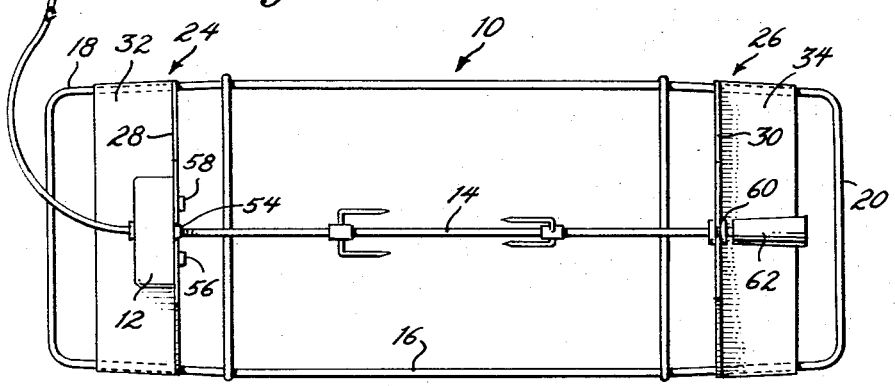
FIG. 2 is a top view of the apparatus as shown in FIG. 1.
Figure 3:
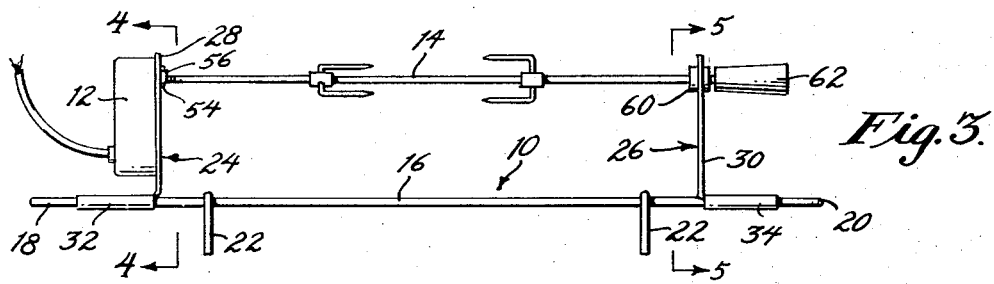
FIG. 3 is a side elevational view of the rotisserie shown mounted on a grill with the spit in its upper position.
Figure 6:
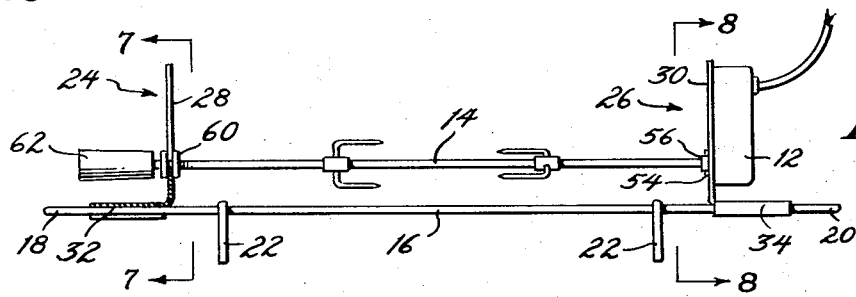
FIG. 6 is similar to FIG. 3 but shows the spit in its lower position.
Figure 7:
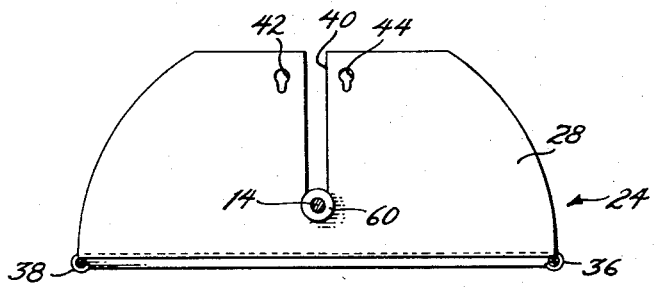
FIG. 7 is an enlarged view looking in the direction of line 7—7 on FIG. 6.
Figure 8:
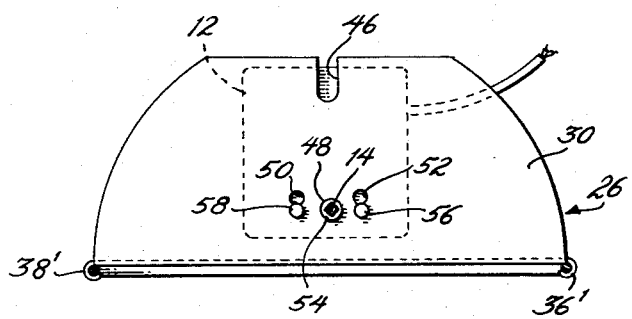
FIG. 8 is an enlarged view looking in the direction of line 8—8 on FIG. 6.

When the spit is to be used in its upper position as shown in FIGS. 1, 3, 4 and 5, motor 12 is secured to spit support 24 in which position the motor shaft will align with the bottom of slot 46 and the spit 14 will be well spaced from the plane of frame 16 as shown in FIG. 2. When the spit is to be used in its lower position, as seen in FIGS. 6, 7 and 8, motor 12 is turned over and secured to support 26, in the manner above described. In this position, shaft 54 aligns with opening 48 in spit support 26 and hub 60 engages the bottom of slot 40 which also aligns with opening 48.

In the claims the word "meat" is used to mean any heat-cooked food which is supported by spit 14.

What we claim is:

1. A rotisserie including:
   a base,
   a spit,
   a first spit supporting member (26), a first means (slot 46) carried by said first member for supporting one end of said spit at a relatively high position above said base,
   a motor,
   a motor shaft (54) engageable with the other end of said spit,
   a second spit support (24),
   second means (key slots 42 and 44) carried by the second support member for supporting said motor with its shaft at a correspondingly high position for engagement with the other end of said spit, to support the latter in a horizontal position,
   third means (bottom of slot 40) carried by said second support member (28) for supporting said one end of the spit in a relatively low position above said base,
   fourth means (opening 48) carried by said first support member (26) for supporting the motor with its shaft at a correspondingly low position above said base for engagement with the other end of said spit when the latter is in its lower position, each of said spit-supporting members comprising a vertical wall and a horizontal member, the length of each of said horizontal members being greater than the width of said base, and the ends of each horizontal member being bent toward each other to form channels for detachably and slidably engaging the opposite ends of said base, respectively.

2. A portable rotisserie including:
   an open base (10) adapted to be mounted over a source of heat, and
   a meat-supporting and rotating mechanism comprising:
   a spit,
   a first spit support (24) near one end of said base, a second spit support near the other end of said base,
said first support (24) having a substantially vertical, spit-receiving slot (40) leading from the upper edge thereof to a point relatively close to said base and having at least one lug-receiving opening near the upper end of said slot,
said second support (26) having a spit-receiving slot leading from the upper edge thereof to a point relatively remote from said base and having at least one lug-receiving opening relatively close to said base,
said second support also having a spit-receiving opening (48) which aligns with the lower end of the slot in said first support,
a motor housing,
a motor in said housing,
a motor shaft near one end of said housing and engageable with one end of said spit, and
at least one lug carried by said motor near said shaft, and engageable with the lug-receiving opening in said first spit support to mount said spit in a substantially horizontal plane passing through the bottom of second slot, said lug being engageable with the lug-receiving opening in said second spit support to mount said spit in a substantially horizontal plane which includes the axis of said spit receiving opening.

References Cited

UNITED STATES PATENTS

| | | | |
|---|---|---|---|
| 2,046,352 | 7/1936 | Warner | 99—421 |
| 2,388,831 | 11/1945 | Cramer | 99—421 |
| 2,797,633 | 7/1957 | Goodwin | 99—421 |
| 2,845,856 | 8/1958 | Sack | 99—421 |
| 2,849,948 | 9/1958 | Rowley | 99—421 |
| 3,013,550 | 12/1961 | Murchie | 99—421 |
| 3,163,103 | 12/1964 | Shoup | 99—421 |
| 3,247,779 | 4/1966 | Willman | 99—421 |
| 3,257,937 | 6/1966 | Mell | 99—421 |

WALTER A, SCHEEL, *Primary Examiner.*

A. O. HENDERSON, *Assistant Examiner.*